June 24, 1958     E. L. CLARKE     2,840,778
MAGNETIC AMPLIFIERS
Filed July 13, 1955
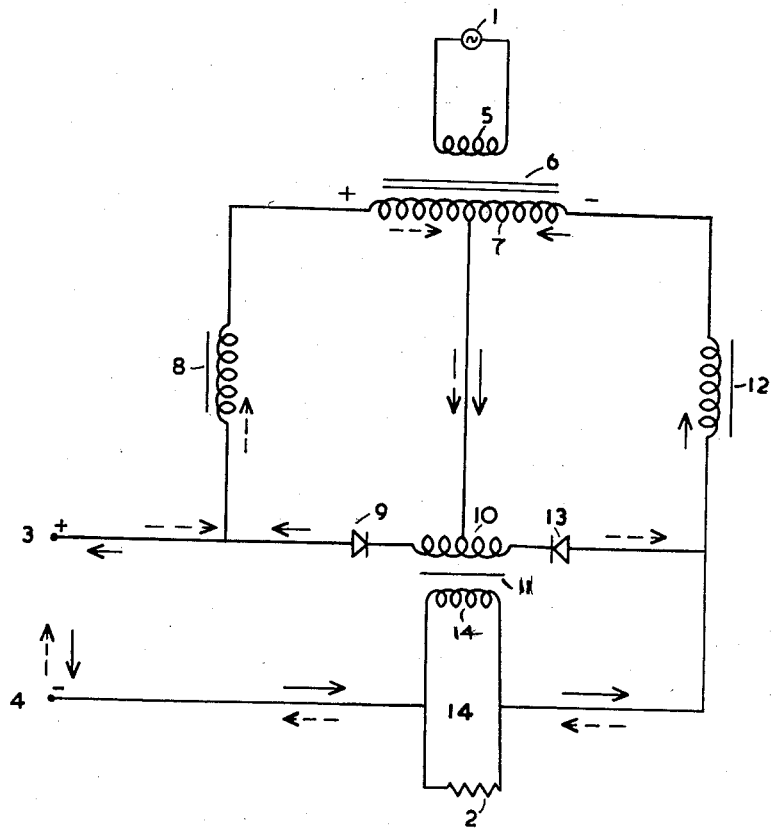
INVENTOR;
E. L. CLARK
BY:
ATTORNEYS.

United States Patent Office 2,840,778
Patented June 24, 1958

2,840,778

MAGNETIC AMPLIFIERS

Edwin L. Clarke, Gloucestershire, England, assignor to Smiths America Corporation, Lakeland, Fla.

Application July 13, 1955, Serial No. 521,846

Claims priority, application Great Britain July 16, 1954

9 Claims. (Cl. 323—89)

The present invention relates to amplifiers incorporating saturable reactors, or transductors. In the past it has been proposed to provide rectifiers in series with the power windings of tranductors to give self-excitation, and it has been usual to control transductors by means of control windings carried on the transductor cores, a direct control current being applied to the said windings to provide a unidirectional component of flux in the cores for control purposes. When transductors are required to be controlled by an alternating signal it has hitherto been the practice to convert the alternating signal to a direct current by a conventional rectifier circuit, and utilise the output therefrom to control the transductors.

According to the present invention, a magnetic amplifier incorporating transductors having rectifiers in series with their windings to provide self excitation, and adapted to control the supply of power from an A. C. source to a load is controlled by an A. C. signal of the same frequency as the said source and having a substantial component in phase (or antiphase) therewith, and the said A. C. signal is rectified by the self-excitation rectifiers to provide a unidirectional control flux in the transductor cores.

An embodiment of the invention will now be described with reference to the accompanying drawing.

As there shown, the flow of power from an A. C. source, indicated at 1, to a load, indicated as a resistor 2, is controlled in accordance with an A. C. control signal, in phase or out of phase with the output of source 1, applied between terminals 3 and 4. Source 1 is connected to the primary 5 of a transformer 6 having a centre-tapped secondary 7. One extreme terminal of secondary 7 is connected in series with the winding of a transductor 8 and a rectifier 9 to one extreme terminal of the centre-tapped primary winding 10 of an output transformer 11. The other extreme terminal of 7 is connected in series with the winding of a further transductor 12 (similar to 8) and a further rectifier 13 (connected in the opposite sense to rectifier 9) to the other extreme terminal of 10. The centre taps of 7 and 10 are connected together. The secondary 14 of transformer 11 has half the number of turns of primary 10, and is connected to resistor 2. One terminal of 14 is connected to terminal 4 and the other to the junction of the winding of transductor 12 and rectifier 13. The junction of the winding of transductor 8 and rectifier 9 is connected to terminal 3. Rectifiers 9 and 13 provide self excitation of the transductors.

The manner of operation of the circuit may be explained somewhat as follows:

If we consider a half cycle of source 1 in which the terminals of winding 7 and terminals 3 and 4 have the polarities indicated, during at least part of that cycle rectifier 9 will be conducting and rectifier 13 cut off. Current due to the source 1 will flow through transductor 8, rectifier 9 and one half of the primary of transformer 11 (the load current) and also as indicated by the full arrows (signal current). The magnitude of the signal voltage applied to terminals 3 and 4 will control the value of the signal current. During the next half cycle current due to source 1 will flow through transductor 12, rectifier 13 and the other half of the primary of transformer 11 (the load current) and also as indicated by the dotted arrows (signal current). Again the magnitude of the signal voltage applied to terminals 3 and 4 will control the value of the signal current. Thus the signal voltage will control the level of flux produced in each transductor in turn when each transductor is not passing its load current and thereby control the load current in the next cycle. The signal voltage will always be of the same phase, (i. e. the signs of the potentials will be either as shown or all reversed) and will give a full range of control when varied between the values of zero and half the full secondary voltage of transformer 6. The signal input is thus rectified by rectifiers 9 and 13 and provides control flux in the transductor cores.

Thus the supply of power from source 1 to load 2 is controlled in accordance with the signal applied between terminals 3 and 4.

The sense of connection of the windings of transformer 11 is such that the input and output are effectively decoupled from each other.

I claim:

1. A magnetic amplifier to control the supply of power from an A. C. source to a load under the control of an A. C. signal having a substantial component in phase with the output of the source comprising transductors, each having a winding and a saturable core, power being transmitted from the source to the load through the respective windings, rectifiers connected one in series with each of said windings to provide self-excitation of the transductors, and means to apply said A. C. signal to said rectifiers, said rectifiers rectifying the A. C. signal and the A. C. signal establishing a unidirectional component of flux in each core to control the transmission of the power to the load through the associated winding comprising two similar transductors each having a rectifier in series with its winding, the two rectifiers being connected in series with each other and being rendered conductive in successive half cycles of the source and the A. C. signal being applied across the rectifiers wherein the rectifiers are connected in opposite senses and comprising means to develop between the terminals of the transductor windings remote from the rectifiers a voltage derived from the source, said means to develop a voltage between the transductor winding terminals comprising a first transformer, the said transformer having a centre-tapped secondary, the transductor windings being connected respectively to the extreme terminals of the secondary, and a second transformer, said second transformer having a centre-tapped primary, the extreme terminals of the primary being respectively connected to the terminals of the rectifiers remote from the transductor winding terminals and the centre-tap being connected to the centre-tap of the first transformer secondary, wherein a secondary of said second transformer is connected in series with the A. C. signal and the rectifiers effectively to decouple the input and output of the amplifier, said secondary of the second transformer being connected to the load.

2. An amplifier as claimed in claim 1 wherein the secondary of the further transformer is connected across the load, the secondary of the further transformer having substantially half the number of turns of the primary.

3. A magnetic amplifier to control the supply of power from an A. C. source to a load under the control of an A. C. signal having a substantial component in phase with the output of the source comprising transductors, each having a winding and a saturable core, power being transmitted from the source to the load through the respective windings, rectifiers connected one in series with each of said windings to provide self-excitation of the transductors the load current of each transductor flowing through the rectifier associated therewith, and means to apply said A. C. signal to said rectifiers, said rectifiers rectifying the A. C. signal and the A. C. signal establishing a unidirectional component of flux in each core to control the transmission of the power to the load through the associated winding.

4. An amplifier as claimed in claim 3 comprising two similar transductors each having a rectifier in series with its winding, the two rectifiers being connected in series with each other and being rendered conductive in successive half cycles of the source and the A. C. signal being applied across the rectifier.

5. An amplifier as claimed in claim 4 wherein the rectifiers are connected in opposite senses and comprising means to develop between the terminals of the transductor windings remote from the rectifiers a voltage derived from the source.

6. An amplifier as claimed in claim 5 wherein the means to develop a voltage between the transductor winding terminals comprising a first transformer, the said transformer having a center-tapped secondary, the transductor windings being connected respectively to the extreme terminals of the secondary and the center-tap being connected to the junction of the rectifiers.

7. An amplifier as claimed in claim 6 and a second transformer, said second transformer having a center-tapped primary, the extreme terminals of the primary being respectively connected to the terminals of the rectifiers remote from the transductor winding terminals and the center-tap being connected to the center-tap of the first transformer secondary.

8. An amplifier as claimed in claim 7 wherein a secondary of said second transformer is connected in series with the A. C. signal and the rectifiers effectively to decouple the input and output of the amplifier.

9. An amplifier as claimed in claim 8 wherein said secondary of the second transformer is connected to the load.

References Cited in the file of this patent

UNITED STATES PATENTS 2,683,853    Logan _____ July 13, 1954